US012271425B2

(12) United States Patent
Maier et al.

(10) Patent No.: US 12,271,425 B2
(45) Date of Patent: Apr. 8, 2025

(54) CONDENSING HIERARCHIES IN A GOVERNANCE SYSTEM BASED ON USAGE (71) Applicant: International Business Machines Corporation, Armonk, NY (US)

(72) Inventors: Albert Maier, Tuebingen (DE); Mike W. Grasselt, Leinfelden-Echterdingen (DE); Yannick Saillet, Stuttgart (DE); Lars Bremer, Boeblingen (DE); Michael Baessler, Bempflingen (DE)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 17/340,219

(22) Filed: Jun. 7, 2021

(65) Prior Publication Data
US 2022/0391848 A1    Dec. 8, 2022

(51) Int. Cl.
G06F 16/901    (2019.01)
(52) U.S. Cl.
CPC ................. G06F 16/9027 (2019.01)
(58) Field of Classification Search
CPC .................................................. G06F 16/9027
See application file for complete search history.

(56) References Cited

U.S. PATENT DOCUMENTS

| 9,547,478 | B1 | 1/2017 | Hale | |
| 2003/0177481 | A1* | 9/2003 | Amaru | G06F 16/25 717/148 |
| 2007/0027887 | A1* | 2/2007 | Baldwin | G06F 40/35 |
| 2012/0209582 | A1* | 8/2012 | Purushothaman | G06N 5/02 703/13 |
| 2014/0278362 | A1* | 9/2014 | Gerken, III | G06F 16/367 704/10 |
| 2015/0186500 | A1 | 7/2015 | Rope | |
| 2016/0378454 | A1* | 12/2016 | Nekrestyanov | G06F 8/65 717/170 |

(Continued)

OTHER PUBLICATIONS

Boutsinas et al., "On Merging Classification Rules", Jun. 23, 2007, 20 pages, <https://www.worldscientific.com/doi/abs/10.1142/S0219622008003034>.

(Continued)

*Primary Examiner* — Apu M Mofiz
*Assistant Examiner* — Dara J Glasser
(74) *Attorney, Agent, or Firm* — Jeffrey M. Ingalls (57) ABSTRACT Embodiments of the present invention provide methods, computer program products, and systems. Embodiments of the present invention can condense a hierarchy in a data governance system, wherein the hierarchy comprises a root node and at least one child node comprising related sub-trees by determining, for a parent node in the hierarchy of governance system, governance terms and respective assignment relationships from a plurality of information assets, determining usage of the governance term in at least one of a plurality of governance rules, and marking a governance term of the plurality of governance terms for elimination based on the determined assignment relationships and the determined usage of the governance term in the plurality of governance rules. Embodiments of the present invention can then delete the governance term from the hierarchy if the governance term is marked for elimination.

16 Claims, 6 Drawing Sheets

(56) References Cited

U.S. PATENT DOCUMENTS

| | | |
|---|---|---|
| 2017/0277728 A1 | 9/2017 | Melamed |
| 2018/0096003 A1* | 4/2018 | Vaishnav ............... G06F 16/215 |
| 2019/0155926 A1* | 5/2019 | Scheideler ............ G06F 16/215 |
| 2019/0251272 A1* | 8/2019 | Ravizza ............ G06F 18/23213 |
| 2020/0228558 A1* | 7/2020 | Apostolopoulos .......................... H04L 63/1425 |
| 2020/0234242 A1 | 7/2020 | Parks |

OTHER PUBLICATIONS

Junpeng et al., "A Hierarchical Reduction Algorithm for Concept Hierarchy", Proceedings of the Sixth International Conference on Intelligent Systems Design and Applications (ISDA'06), © 2006 IEEE, 6 pages, <https://ieeexplore.ieee.org/document/4021529>.

Swamy, Kumara M., "Concept Hierarchy Based Diverse Frequent Patterns", Aug. 2019, 119 pages, <http://web2py.iiit.ac.in/research_centres/publications/download/phdthesis.pdf.bf9dad1af70ff0a3.4b756d6172617377616d795f5468657369732e706466.pdf>.

* cited by examiner

108 DELETE THE GOVERNANCE TERM FROM THE HIERARCHY IF THE GOVERNANCE TERM IS MARKED FOR ELIMINATION

402 EXEMPT THE GOVERNANCE TERM FROM DELETION FOR A PREDETERMINED GRACE PERIOD IF THE GOVERNANCE TERM AND ALL RELATED GOVERNANCE TERM CHILDREN IN THE HIERARCHY ARE YOUNGER THAN A PREDEFINED MINIMUM AGE

404 DETERMINE IF A TOTAL NUMBER OF ASSIGNMENT RELATIONSHIPS TO THE GOVERNANCE TERM AS PARENT NODE AND ALL RELATED GOVERNANCE TERM CHILDREN IN THE HIERARCHY IS BELOW AN ASSIGNMENT THRESHOLD NUMBER

406 "NO" FROM "402" AND "YES" FROM "404"

408 CONFIRMATION SIGNAL?

410 REPLACE ... BY PARENT NODE

412 DELETE

CONDENSING HIERARCHIES IN A GOVERNANCE SYSTEM BASED ON USAGE

BACKGROUND

The present invention relates generally to restructuring a hierarchy, and more specifically, to restructuring a hierarchy by condensing the hierarchy in a data governance system.

Generally, Information Technology (IT) projects in enterprises are not as successful as originally planned. Indeed, a large percentage of projects can be deemed unsuccessful and/or terminated altogether. One of the most successful approaches for long-term success of IT projects is the definition of an appropriate IT architecture. It has been proven that a sequential process starting from the annual business report of an enterprise, via a business architecture, a process architecture, a data or information architecture to a technical architecture builds a solid basis to manage a portfolio of applications, services and technologies supporting the technical architecture and finally delivering a business value to the enterprise. To be successful in this process, a large number of definitions about meanings of specific terms has to be made so that each constituent in the process fully understands consequences involved in changing framing conditions and thus technical elements. Hence, a lot of transformations from non-technical terms to technical terms have to be made in this process in order to build a solid technical foundation using technology components which support the defined architecture for a frictionless integration of applications and a seamless data flow.

One way to achieve this transformation of terms back and forth for different audiences is to rely on information governance concepts which bring real life terms, data classes and reference data into a relationship for building the core of a sophisticated modern information governance solution. Inherent to such concepts is that they are often hierarchical in nature, i.e., a concept could have many sub-concepts (e.g., real-life terms) that may have sub-concepts again. One example may be the term "address" which may have as a sub-concept "email address" with again another sub-concept "Lotus Notes ID". Often, those "concept hierarchies" are called taxonomies. Taxonomies are typically built by experts in their respective technical area; and they could easily get very deep into hierarchy levels. It is very common that only a small subset of a taxonomy is meaningful to the end users or consumers of IT services. Sometimes, even technical users are not exploiting the full depth.

For example, meaningful concepts that are not really used by end users waste money and resources, and users still come across search results that are too fine-grained for this purpose. This is often the source for wasted time and wasted system resources. Additionally, over time, these taxonomies or hierarchies of real-world concepts are getting broader and deeper and may slowly tend to not fully address the current requirements of the underlying technical framework of enterprise solutions and the end-user consuming them. This may apply especially to those conceptual and technical architectures using the concept of a service-oriented architecture (SOA) and an intensive usage of Cloud computing based services from external—i.e., external to a given enterprise IT center—service providers.

There are several disclosures related to a computer-implemented method for condensing a hierarchy in a data governance system. Additionally, document U.S. Pat. No. 9,547,478 B1 discloses methods, systems, and operations for performing hierarchical dependency analysis using disjoint-or trees. One of the methods includes receiving, from a user, a request to remove a node from a hierarchy, wherein the hierarchy is a directed graph having nodes and links, wherein each node in the hierarchy represents a software element in the project and each directed link in the hierarchy connects corresponding pair of the nodes and represents a containment of a child software element represented by a first node of the pair by a parent software element represented by a second node of the pair.

Additionally, the document US 2020/0 234 242 A1 discloses techniques for using finite state machines to implement workflows in a data processing system comprising at least one data store storing data objects and a workflow management system. The workflow management system is configured to perform: determining a current value of an attribute of a first data object by its accessing the current value in the at least one data store; identifying, using the current value and metadata specifying relationships among at least some of the data objects, an act or authorized to perform a workflow task for the first data object; generating a GUI (graphical user interface), and receiving input specifying that the workflow task is to be performed.

A disadvantage of known solutions may be seen in the fact that their related hierarchical concept tree is not self-organizing so that real-world terms, its meaning, technical terms and its meanings as well as related dependencies are not aligned with the end-user understanding as well as technical requirements for a seamless information, process and application architecture.

Hence, there may be a need to overcome the described dilemma and to provide a solution for an advantage to self-management of such transformation and translation tools in order to derive technical consequences out of changes to the concept hierarchy.

SUMMARY

According to one aspect of the present invention, a computer-implemented method for condensing a hierarchy in a data governance system may be provided. The hierarchy may comprise a root node and at least one child node comprising related sub-trees and the method may comprise determining for a parent node in a hierarchy of governance terms assignment relationships from a plurality of information assets to at least one of the governance terms in its sub-tree, determining whether the governance term is used in at least one of a plurality of governance rules, determining a governance term for elimination depending on the determined assignment relationships and the determined usage of the governance term in the plurality of governance rules, and deleting the governance term from the hierarchy if the governance term is marked for elimination.

According to another aspect of the present invention, a related hierarchy condensing system for condensing a hierarchy in a data governance system may be provided. The hierarchy may comprise a root node and at least one child node comprising related sub-trees and the hierarchy condensing system may comprise a processor and a memory. The memory may be communicatively coupled to the processor, wherein the memory stores program code portions that, when executed, enable the processor, to determine for a parent node in a hierarchy of governance terms assignment relationships from a plurality of information assets to at least one of the governance terms in its sub-tree, determine whether the governance term is used in at least one of a plurality of governance rules, determine a governance term for elimination depending on the determined assignment relationships and the determined usage of the governance term in the plurality of governance rules, and delete the governance term from the hierarchy if the governance term is marked for elimination.

The proposed computer-implemented method for condensing a hierarchy in a data governance system may offer multiple advantages, technical effects, contributions and/or improvements:

In general, the handling of data assets—in particular, creating, receiving, maintaining, deleting, managing dependencies, controlling data lifecycles, etc.—may be optimized under a variety of different aspects. Governance term hierarchies may have a tendency to only grow in enterprise computing environments. Hence, they may become very complex, may relate to many data governance rules and policies and may only be understood under certain sub-aspects. In particular, if the generation of different data governance managers may be involved or if a system and/or application or service (the sense of a computer service) portfolio may be changed it may often happen that for governance terms that are no longer required in the hierarchy of governance terms conditions may remain with no additional value for the supported and maintained IT infrastructure.

The method and system proposed here may help to maintain a hierarchy of governance terms that are used actively in the context of available data assets and may support—in particular, in an automated fashion—to clean the hierarchy of governance terms from superfluous and/or unused governance terms. As a consequence, only those governance terms are managed in the hierarchy that may actually be used to consistently manage the related data assets.

Hence, the hierarchy or tree of governance terms is managed actively and partially with automatisms so that only those governance terms stay in the hierarchy that are useful for managing the data assets. Hence, the hierarchy becomes more understandable and usable, requires less memory space, and thus requires less storage, network and computing resources leading to a higher efficiency, and may help to increase the speed of execution for used data governance management systems and programs. In a nutshell, the tree or hierarchy of governance term may be slimmed down to a minimum required size in a self-organizing manner.

In the following, additional embodiments of the inventive concept—applicable for the method as well as for the system—will be described.

According to one interesting embodiment of the method, the information assets may be addressable data elements or groups thereof. They may be persistently stored in any form, any type, size and structure and stored on any storage medium and/or any location. An example may be a customer name, production site location, an invoice, a name and/or a logistics partner, sold goods, an employee record, shareholder identifier, but also a program element, an image of a virtual, telephone connection data, tweets, scientific measured data, e.g., seismic measurement data, IoT (Internet-of-Things) sensor data, weather data, required compute recourse predictions, and maps, metadata of trained AI models, just to name a few. Hence, a data asset may relate to pure technical expressions and/or data from real-life assets.

According to an advantageous embodiment of the method, the determining the governance term for elimination may comprise exempting the governance term for deletion from a predetermined grace period if the governance term and all related governance term children in the hierarchy are younger than a predefined minimum age. Otherwise, one may end up in a loop process: A new governance term may have been defined but the data stewards may have had no time to link them to data. In this case, the new terms may already have been deleted by the proposed method before there was a chance to use the new term productively. This modified version of the method may give data stewards and other users a chance to learn and adapt to new described concepts over time. The grace period may be adapted according to the underlying concept hierarchy (i.e., the data governance terms used). For a long term usage ad slow changing concept hierarchies the grace period may be selected to be in the range of a complete year. This may give the users enough time to adapt themselves to the new concepts. In other cases—e.g., when changing the underlying organization or data concept, moving to new enterprise applications or a take-over of a new business unit—the grace period may be selected to be shorter, e.g., 1 month. Thus, the grace period may be adapted to the context in which the concept proposed here may be implemented.

According to another advantageous embodiment of the method, the determining the governance term for elimination may comprise marking the governance term for deletion if a total number of assignment relationships to the governance term as parent node and all related governance term children in the hierarchy are below an assignment threshold number. Hence, those governance terms having no or only a little number of peers may be deemed to have little importance. These may be deleted with higher probability.

According to a further developed embodiment, the method may also comprise preventing the governance term from being marked for deletion if the governance term may be used in more than a predefined threshold rule number of the plurality of relationship rules, e.g., >1. This may be an indication for a semantic conflict. Consequently, a deletion should not happen.

According to a useful embodiment of the method, the eliminating the governance term may comprise receiving a confirmation signal before deleting the marked governance term. Such a confirmation signal may be received via a user input and may be entered via user interface. However, the confirmation signal may also originate from another surveillance system of a higher order and higher confidence values, e.g., a trained artificial intelligence system, e.g., in the form of a neural network.

According to a permissive embodiment of the method, the deletion of the governance term may also comprise replacing an assignment relationship—i.e., from the related information assets—to the governance term by an assignment relationship to the parent node of the deleted governance term in the hierarchy. Naturally, this replacement should happen before the deletion may happen in order to keep the required logical connection.

According to an advanced embodiment of the method, the deletion of the governance term may also comprise replacing the deleted governance term in any of the plurality of governance rules by the parent node of the deleted governance term in the hierarchy. Of course, also here the replacement may happen before the deletion in order to comply with integrity requirements.

According to a further enhanced embodiment of the method, a governance rule may define constraints to elements of the information assets in a category selected out of the group comprising data quality criteria, data life cycle characteristics, data protection categories and, data security requirements. Hence, the governance rule may define allowed and unallowed actions to the data assets. E.g., a data link from one production site may only be deleted if another data link is available to the production site or—in another example—all data access and data deletion rules need to be compliant with GDPR (General Data Protection Regulation in the European Union).

According to an optional embodiment of the method, a governance term may be selected out of the group comprising reference data, technical descriptors—e.g., being part of an ontology—location data (e.g. GPS coordinates), and group names. Hence, all real-world data may be used as governance terms. However, the same may apply to any technical terms relating to the technical infrastructure of an IT center, or production equipment or logistics equipment and the like.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

In the context of this description, the following conventions, terms and/or expressions may be used:

The term 'condensing a hierarchy' may denote getting rid of unnecessary nodes in a hierarchical set up or tree structure of nodes, terms or concepts. Hence, after a condensation step or an elimination step, only a subset of the nodes of the hierarchy tree may remain. Such a consolidation may reflect dependencies between the subject-matter of a node and relationships external to the node. Such external relationships may comprise relationship assignments to datasets and are governance rules. A node itself may represent a governance term, a concept or similar.

The term 'data governance system' may denote—as a minimum—a set of rules of how to manage and maintain data assets. The data governance system may either be an abstract concept or a software application whether a user interface, the computer environment and some storage to manage and manipulate data governance terms. The complete set of data governance terms for a given environment may also be denoted as data glossary which may relate more to real-life terms; however, also data dictionaries with a deeper level of technical descriptions may be used as a basis for the data governance system.

The term 'root node' may denote a top note of first note of a hierarchy or tree structure. The root node may have no parent node but at least one—typically more than one—child nodes.

The term 'child node' may denote a node in a hierarchy or tree-like structure having a parent node. In that sense, the term 'governance term children' may denote one or more nodes depending on a parent node in the hierarchy of governance terms.

The term 'sub-tree' may denote a plurality of interlinked nodes in a hierarchy depending directly or indirectly from the root node or an intermediate node being position in the hierarchy between the root node and the sub-tree. The top-level node of the sub-tree may be part of the sub-tree.

The term 'parent node' may denote a node in a hierarchy or tree structure having interlinked nodes of a lower-level. If a node may have no dependent other nodes—i.e., no child nodes—the node may be denoted as leaf node.

The term 'governance term' may denote a description for a real-life concept. Some examples may comprise defined standards, data protection limitations to ensure that the data are probably protected from loss or inappropriate use. Governance term may also relate to lifecycle management, e.g., information retention and information disposal, as well as to data quality and/or information supply chain integrity. However, also concepts of compliance with government rules and regulations may be addressed by the governance terms, as well as standards to be met in terms of information requirements, information identification, information architecture and information dependencies.

The plurality of governance terms together with a government system may ensure in an enterprise IT environment that systems are built according to appropriate standards that people and systems operate properly, that data are kept for an appropriate length of time and that, e.g., the data quality requirements are in use and are met. Some of these concepts may be directed to data privacy concepts like GDPR (EU's general data privacy regulation).

The term 'assignment relationship' may denote a defined logical connection between a node in the governance hierarchy (i.e., hierarchy of governance terms) and dedicated information assets. The assignment relationship from a governance term to information assets may, in general, be a 1:n dependency.

The term 'information asset' may denote any data collected, generated, stored, managed and maintained in an enterprise IT environment. Some examples may comprise: a descriptor for a component of a more or less complex machine, a component or group of components of a computing system or network or storage system, a customer record, a name of a business partner, a recipe and/or method how to produce a complex chemical compound, a logistics route, an organization plan, a building and location plan of a commitment in a factory, measured quality parameter values in a production line, and so on, and so on. The data may relate to technical environments, as well as real-life descriptors.

The term 'governance rule' may denote a dependency as part of a policy or data treatment rule defining constraints and limitations for how to manage, manipulate and store certain data elements or data assets.

The term 'addressable data element' may denote any data field comprising a value that may individually or collectively be addressed by a computing, network and other storage system.

In the following, a detailed description of the figures will be given. All instructions in the figures are schematic. Firstly, a block diagram of an embodiment of the inventive computer-implemented method for condensing a hierarchy in a data governance system is given. Afterwards, further embodiments, as well as embodiments of the hierarchy condensing system for condensing a hierarchy in a data governance system will be described.

Figure 1:
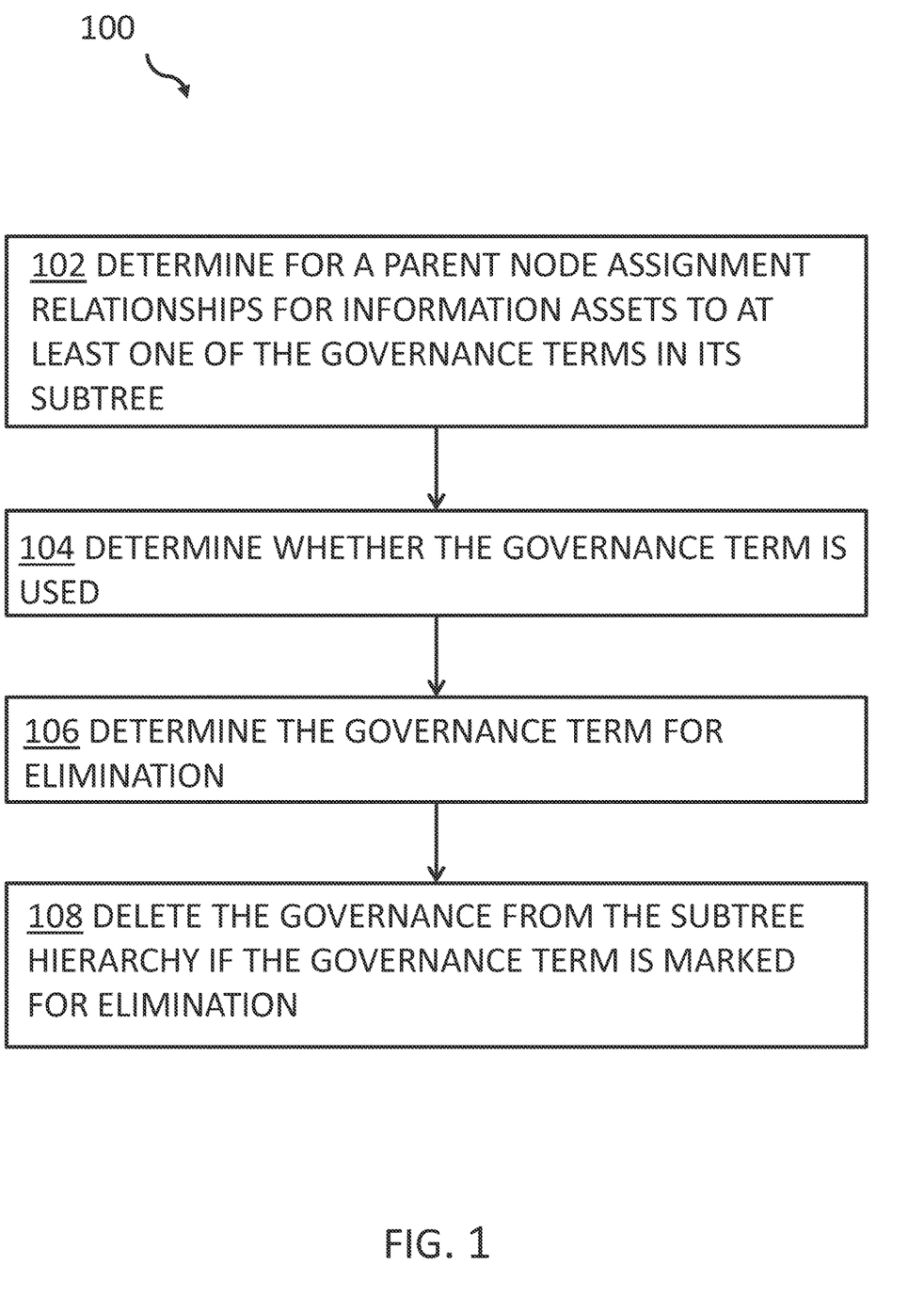
FIG. 1 shows a block diagram of an embodiment of the inventive computer-implemented method for condensing a hierarchy in a data governance system.

FIG. 1 shows a block diagram of a preferred embodiment of the computer-implemented method (e.g., flowchart 100) for condensing a hierarchy in a data governance system. The hierarchy comprises a root node and at least one child node—typically, at least two child nodes are used but not strictly required— comprising related sub-trees, i.e., further node representing governance terms.

Flowchart 100 comprises step 102 which requires determining, for a parent node—and typically for all parent nodes—in a hierarchy of governance terms assignment relationships from a plurality of information assets to at least one of the governance terms in its sub-tree. The information assets may span the complete breadth of options to store data and information in main memory, disk systems, file-systems and in any other form including structured record, semi- or unstructured forms, in binary form, as text, image or video sequence and so on.

Step 104 comprises determining, whether the governance term is used in at least one of a plurality of governance rules, i.e., general usage rules, restrictions and constrains as well as data usage policies, and step 106 which requires determining, a governance term—e.g., of a leaf of the hierarchy or complete sub-tree—for elimination depending on the determined assignment relationships and the determined usage of the governance term in the plurality of governance rules. For example, the governance term may be deleted if no reference to any info assets may exists.

Step 108 comprises deleting, in the sense of eliminating or purging the governance term from the hierarchy if the governance term is marked for elimination. This two-step approach allows for additional data consistency checks before a real deletion is performed and also additional actions may be performed, e.g., replacing the to-be-deleted name or identifier by another governance term so that a consistency of the hierarchy and the relationship to the data assets may be continued.

Figure 2:
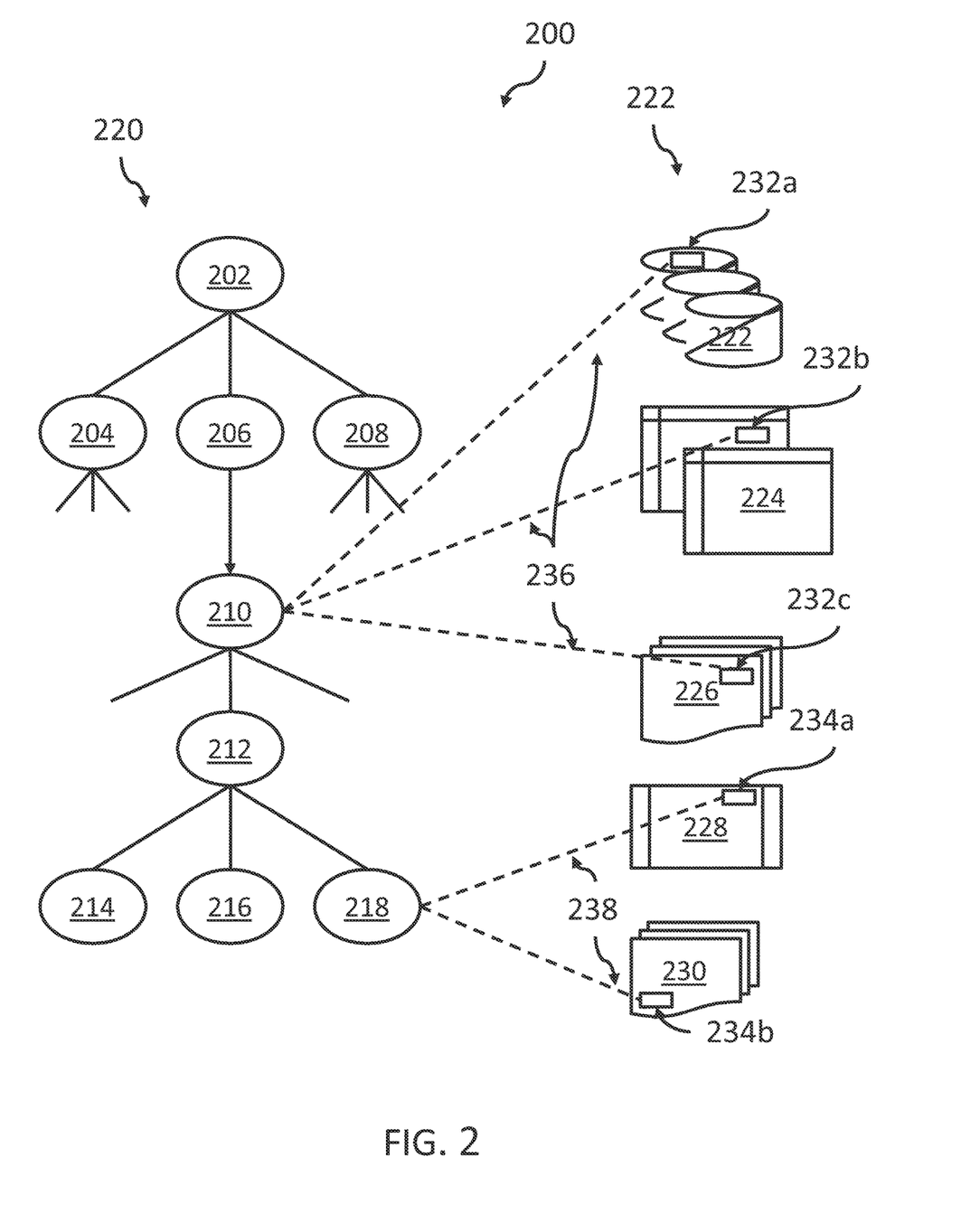
FIG. 2 shows a block diagram of an embodiment of a hierarchy of governance terms and exemplary related data assets.

FIG. 2 shows a block diagram of an embodiment 200 of a hierarchy 220 of governance terms 202, . . . , 218 and exemplary related data assets 222, . . . , 230. The governance terms represent a multi-level dependency tree of real-life—or partially abstracted—terms of any kind, typically used in an enterprise context. This may comprise production facilities, machines, CAD designs, production or manufacturing recipes and related data, a list of parts of a product to be produced but also related logistics and/or shipment data, supplier and customer data, employee and/or project management data, organizational data, and so on. Basically, any kind of data available in an enterprise may be managed and controlled by one or more hierarchies of governance terms.

On the right side of FIG. 2, exemplary sources or storage forms of the data assets are shown, like databases 222 with tables or binary large objects, digitized lists 224, digitized documents (e.g., customer data 226), program code 228 or any other form of electronically stored documents 230. Furthermore, relationships between nodes of the hierarchy 220 of governance terms and data assets are shown as dashed lines. Exemplary, the relationships 236 between the governance term 210 to the data assets 232a, b, c shall be mentioned. The data assets may relate to identifiers or data in different forms of storage containers or may relate to different data on metadata to which the same governance term 210 applies. Hence, generally a one-to-many relationship exists. As second example relationships 238 from governance term 218, two data assets 234a and 234b are shown.

Figure 3:
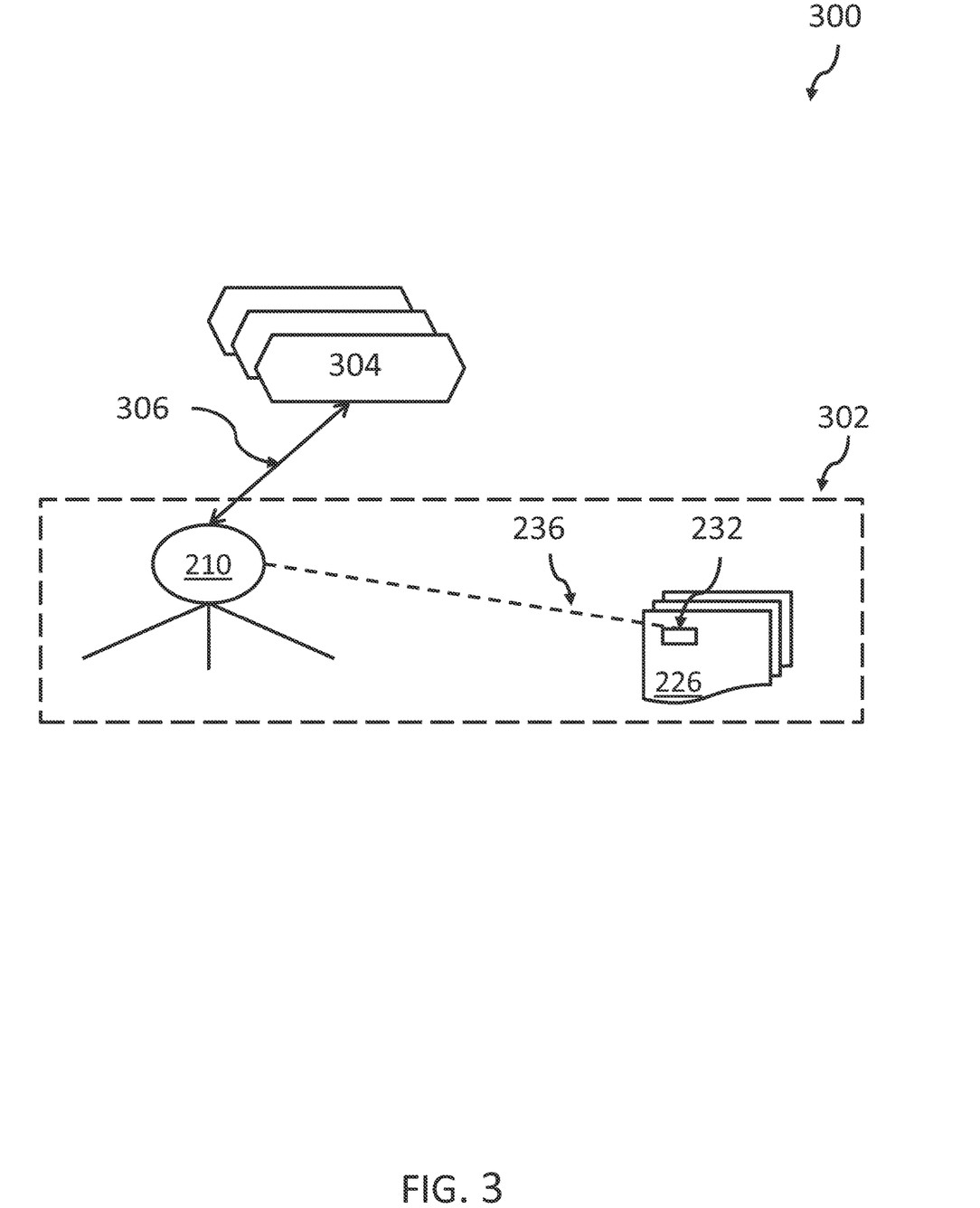
FIG. 3 shows a block diagram of an embodiment of a subset of FIG. 2 together with governance rules.

FIG. 3 shows a block diagram 300 of an embodiment of a subset of FIG. 2 together with governance rules 304 controlling the usage of governance terms and related data, indicated by arrow 306. The dashed box 302 comprises the subset of FIG. 2, namely, the governance term 210, the storage form 226 (also referenced as customer data 226) and the data asset 232 with the relationship 236. A simple example may be that the node 210 refers to the concept of a customer and the data asset may be an identifier of an invoice for a specific customer identifiable by the customer data 226. Hence a seller/buyer relationship exists and goods or service and a compensation have been exchanged in a transaction. According to tax laws (depending on a given country's jurisdiction), such invoice data have to be kept available for a minimum amount of time (e.g., 10 years). On the other side, the invoice may comprise private data (e.g., address or other data for a closer identification of the customer) underlying data privacy regulations. Hence these data have to be deleted upon request of the customer under certain conditions. Such rules and dependencies are then incorporated into the governance rules and policies 304.

In the example of embodiment of block diagram 300, at least one rule 304 exists for the governance term 210. A plurality of such governance rules 304 can exist for each of the governance terms of the hierarchy of governance terms (compare 202, FIG. 1). At this point, it becomes more comprehensible that if there is no defined relationship between a governance term 304 and the data asset and no longer exists for the same governance term 210, the related governance term 210 may be superfluous (e.g., because it is not referred to by any governance rule and does not relate to any data asset). Such is superfluous governance term can be marked for deletion and can also be eliminated from the hierarchy of governance terms.

Figure 4:
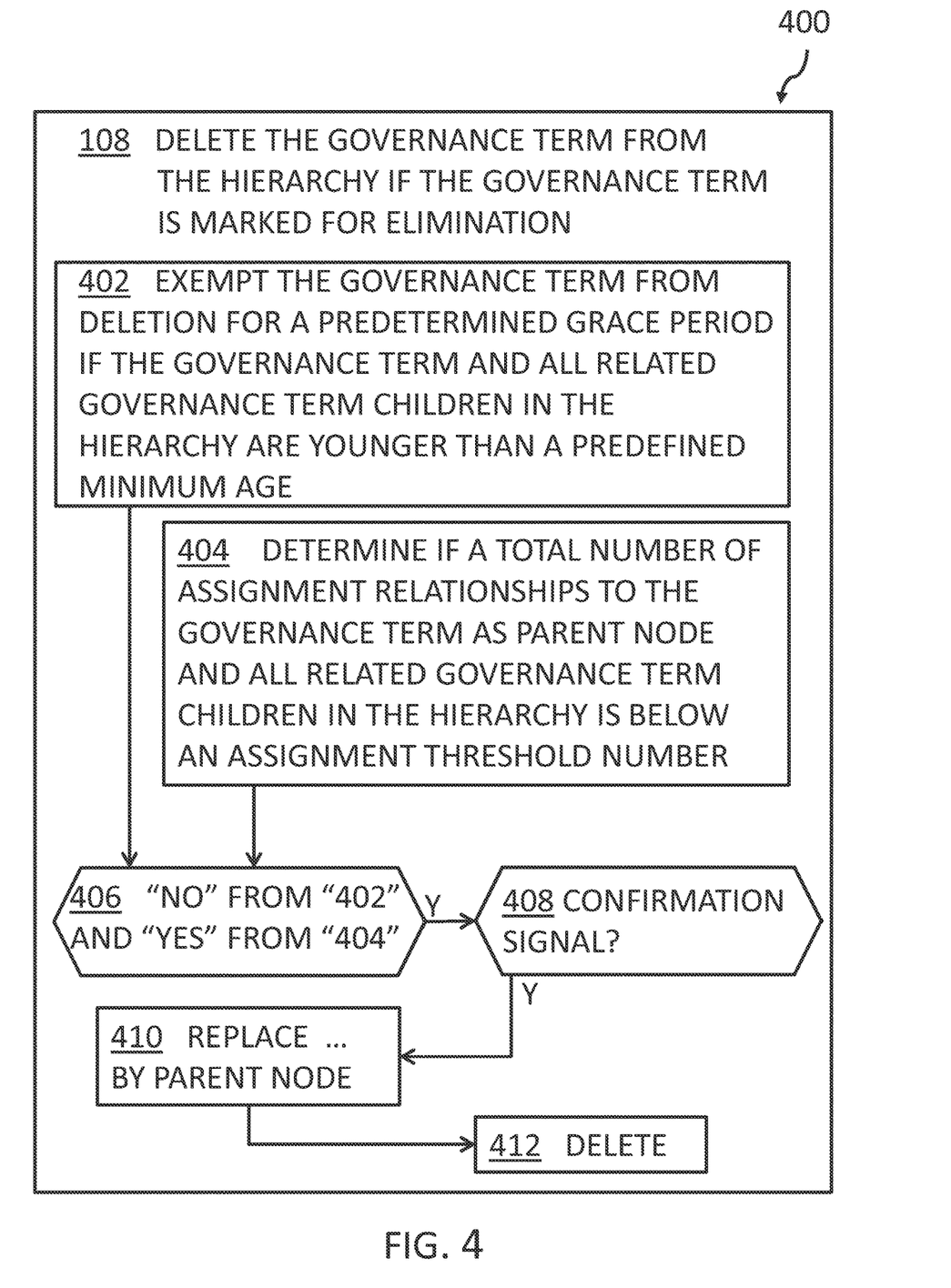
FIG. 4 shows a flowchart of an embodiment of an extension of the method for condensing a hierarchy.

FIG. 4 shows a flowchart 400 of an embodiment of an extension of the method (reference numeral 100, compare FIG. 1) for condensing a hierarchy. In particular, the step of deleting, 108, the governance term from the hierarchy of the governance term is marked for elimination, as shown here with more details. Firstly, a determination 402 is made whether to exempt the governance term from deletion for a predetermined grace period if the governance term and all related governance term children in the hierarchy are younger than a predefined minimum age.

Secondly, it is determined, 404, if a total number of assignment relationships to a specific governance term as parent node and all related governance term children in the hierarchy of governance terms is below an assigned threshold number. If both determinations are positive—determined in the determination step 406 ("yes" in step "402" and step "404")—the method may comprise receiving a confirmation signal. If that deletion confirmation signal has been received—case "Y" in step 408—the governance term in question—i.e., the node marked for deletion one—in the hierarchy of governance terms is replaced, 410, by its parent node in the hierarchy; after that the unused governance term is deleted, 412.

From a technical perspective, the concept proposed here may also be described as follows.

For each root concept RC:
  if RC has no children (this case may need special treatment)
    if any information asset has a relationship with RC or
      if any policy or rule is using RC
    in its definition, then jump to the investigation of the next RC;
    else, delete RC (not used everywhere, no adaption of other artifacts is necessary);
  if RC has children, determine candidates for deletion in the following way:
    for each concept c (i.e., governance term) in the sub-tree underneath RC determine
      the number of relationships that information assets have to c (in the remainder called "direct assignments");
      per policy type and per rule type (i.e., governance rule): the number of relationships that c has two policies respectively rules of that type (some examples for policies and rule types: data quality, data privacy, lifecycle management, . . . );
      the distance of c to RC, i.e., if c is a direct child, it has distance 1, if it is a child of a child of RC, it has distance 2, etc.;
    for each concept c in the sub-tree underneath RC determine
      the total number of relationships to information assets for the full sub-tree constituted by c. This is done by building the sum of the direct assignment numbers of each element of this sub-tree including c itself;
      per policy type and per rule type: the number of concepts for the full sub-tree that is used in definitions of this type;
      the current "minimum concept age" for the full sub-tree constituted by c; this is defined as the time that passed between the latest concept creation date across all elements of this sub-tree including c itself and the current time;
    for each uninvestigated concept c in the sub-tree underneath RC, starting with concepts with the distance 1 first, before going to the next higher distance number:
      check the minimum concept age for c's sub-tree against a preconfigured "minimum age" threshold;
      if the sub-tree is older or same age as the threshold (meaning each concept in this tree has been in production since some time) continue with the next check below;
      if the sub-tree is younger, mark all concepts in it as investigated and jump to the next uninvestigated concept and continue loop
    for each policy type and rule type check the number of concepts:
      if this number is 0 or 1 continue with the next check below;
      if this number is greater than 1 there might be a semantic conflict when deleting concepts; jump to the next uninvestigated concept and continue loop;
      check the total number of relationships for c's sub-tree against a preconfigured "minimum usage" threshold;
      if smaller or equal to the threshold, add the concept c to the list of candidates for deletion (and thus implicitly mark the whole sub-tree constituted by c for deletion); all child concepts in this sub-tree will not be investigated further, regardless of their distance. They are dropped from this investigation; they will be deleted as part of the deletion of c;
      if the number is greater than the threshold value jump to the next uninvestigated concept and continue the loop;
    perform the checks above until all concepts are investigated;
    for each concept c in the deletion list check and adapt the system in the following way:
      for each concept sc in the sub-tree constituted by c (including c itself);
      for all information assets with a relationship to sc replace this relationship by a relationship to the parent concept of c;
      for all policies and rules using sc in their definition replace this usage by the usage of the parent concept of the root of this sub-tree;
      delete all concepts in this sub-tree.

This process may be executed regularly, e.g., monthly for all or a subset of the enterprise data. This way, the governance system becomes—at least in part—self-managing or self-optimizing.

Figure 5:
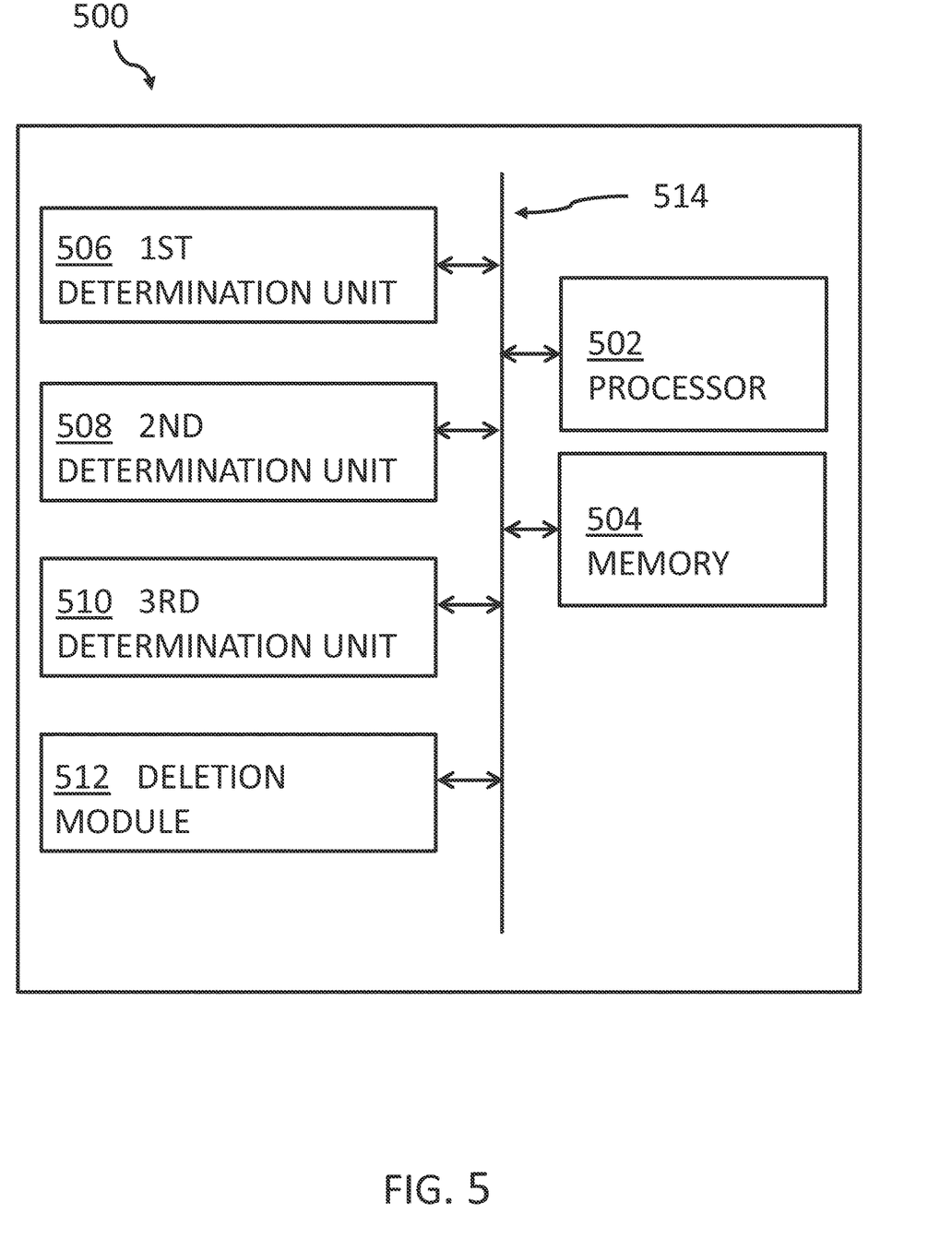
FIG. 5 shows a block diagram of an embodiment of the inventive hierarchy condensing system for condensing a hierarchy in a data governance system.

FIG. 5 shows a block diagram of an embodiment of the inventive hierarchy condensing system 500 for condensing a hierarchy in a data governance system. The hierarchy of governance terms comprises a root node and at least one child node comprising related sub-trees. The hierarchy condensing system 500 comprises a processor 502 and a memory 504, the memory 504 being communicatively coupled to the processor 502, wherein the memory 504 stores program code portions (not shown) that, when executed, enable the processor 502, to determine—e.g., by a first determination unit 506—for a parent node in a hierarchy of governance terms assignment relationships from a plurality of information assets to at least one of the governance terms in its sub-tree, determine—e.g., by a second determination unit 508—whether the governance term is used in at least one of a plurality of governance rules, and determine—e.g., by a third determination unit 510—a governance term for elimination depending on the determined assignment relationships and the determined usage of the governance term in the plurality of governance rules. It may be noted that the first, the second and the third determination unit 506, 508, 510 may be integrated into one combined determination unit.

Additionally, the program code portions enable the processor 502 of the hierarchy condensing system 500 also to delete—in particular by a deletion module 512—the governance term from the hierarchy if the governance term is marked for elimination.

It shall also be mentioned that all functional units, modules and functional blocks may be communicatively coupled to each other for signal or message exchange in a selected 1:1 manner. Alternatively, the functional units, modules and functional blocks can be linked to a system internal bus system 514 for a selective signal or message exchange. This may apply explicitly to the processor 502, the memory 504, the first determination unit 506, the second determination unit 508, the third determination unit 510, and the deletion module 512.

Figure 6:
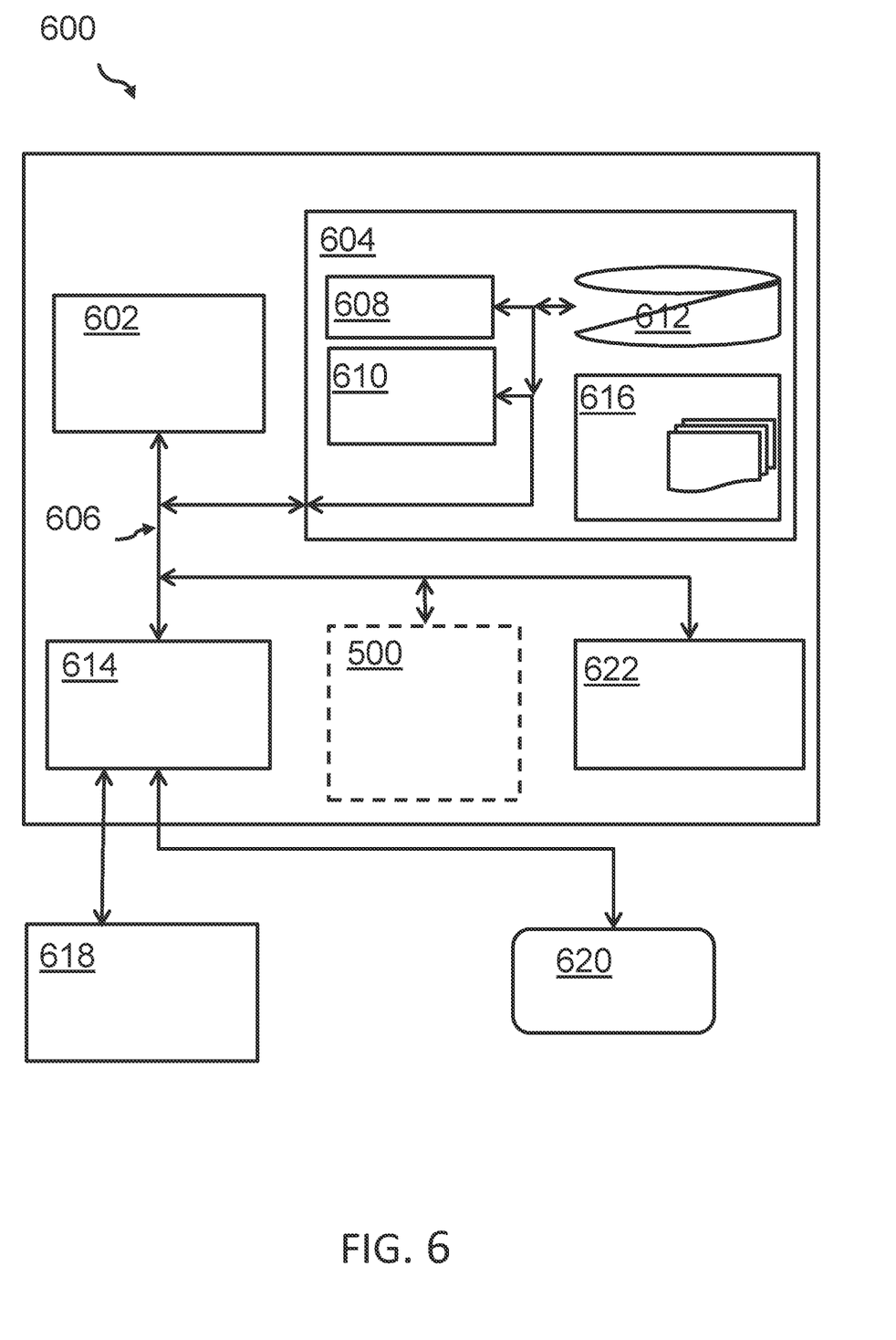
FIG. 6 shows an embodiment of a computing system comprising the system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the hierarchy condensing system 500 for condensing a hierarchy in a data governance system may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method comprising:
   condensing a hierarchy in a data governance system, wherein the hierarchy comprises a root node and at least one child node comprising related sub-trees by:
   determining, for a parent node in the hierarchy of the governance system, governance terms and respective assignment relationships from a plurality of information assets,
   determining usage of a governance term of the governance terms based on the respective assignment relationships that denote a logical connection between a node in the hierarchy and respective dedicated information assets meeting a threshold number of assignment relationships and usage of the governance term of the governance terms in at least one of a plurality of governance rules;
   preventing the governance term from being marked for deletion if the governance term is used in more than a predefined threshold rule number of a plurality of relationship rules;
   in response to determining usage of the governance term fails to meet a threshold number of assignment relationships, marking the governance term of the governance terms for elimination based on the determined usage of the governance term, failure of the governance term to be used in the plurality of governance rules, and existence of a dedicated information asset associated with the governance term, the marking of the governance term comprising exempting the governance term for deletion for a predetermined grace period if the governance term and all related governance term children in the hierarchy are younger than a predefined minimum age; and
   deleting the governance term from the hierarchy in the data governance system that is marked for elimination, wherein the predetermined grace period is based on a context of the governance terms.

2. The computer-implemented method according to claim 1, wherein the plurality of information assets are addressable data elements and groups thereof.

3. The computer-implemented method according to claim 1, wherein marking the governance term for elimination comprises: marking the governance term for deletion if a total number of assignment relationships to said governance term as a parent node and all related governance term children in said hierarchy is below an assignment threshold number.

4. The computer-implemented method according to claim 1, wherein deleting the governance term from the hierarchy further comprises: replacing an assignment relationship to the governance term by an assignment relationship to the parent node of the deleted governance term in the hierarchy.

5. The computer-implemented method according to claim 4, further comprising: replacing the deleted governance term in any governance rule of the plurality of governance rules by the parent node of said deleted governance term in said hierarchy.

6. The computer-implemented method according to claim 1, wherein a governance rule defines constraints to elements of the plurality of information assets in a category selected from a group comprising data quality criteria, data life cycle characteristics, data protection categories and, data security requirements.

7. The computer-implemented method according to claim 1, wherein a governance term is selected from a group comprising reference data, technical descriptors, location data, and group names.

8. A computer system comprising:
   one or more computer processors;
   one or more computer readable storage media; and
   program instructions stored on the one or more computer readable storage media for execution by at least one of the one or more computer processors, the program instructions comprising:
   program instructions to condense a hierarchy in a data governance system, wherein the hierarchy comprises a root node and at least one child node comprising related sub-trees by:
   program instructions to determine, for a parent node in the hierarchy of the governance system, governance terms and respective assignment relationships from a plurality of information assets,
   program instructions to determine usage of a governance term of the governance terms based on the respective assignment relationships that denote a logical connection between a node in the hierarchy and respective dedicated information assets meeting a threshold number of assignment relationships and usage of the governance term of the governance terms in at least one of a plurality of governance rules;
   program instructions to prevent the governance term from being marked for deletion if the governance term is used in more than a predefined threshold rule number of a plurality of relationship rules;
   program instructions to, in response to determining usage of the governance term fails to meet a threshold number of assignment relationships, mark the governance term of the governance terms for elimination based on the determined usage of the governance term, failure of the governance term to be used in the plurality of governance rules, and existence of a dedicated information asset associated with the governance term, the marking of the governance term comprising exempting the governance term for deletion for a predetermined grace period if the governance term and all related governance term children in the hierarchy are younger than a predefined minimum age; and program instructions to delete the governance term from the hierarchy in the data governance system that is marked for elimination, wherein the predetermined grace period is based on a context of the governance terms.

9. The computer system according to claim 8, wherein the plurality of information assets are addressable data elements and groups thereof.

10. The computer system according to claim 8, wherein the program instructions to mark the governance term for elimination comprise: program instructions to mark the governance term for deletion if a total number of assignment relationships to the governance term as a parent node and all related governance term children in said hierarchy is below an assignment threshold number.

11. The computer system according to claim 8, wherein the program instructions stored on the one or more computer readable storage media further comprise: program instructions to receive a confirmation signal before deleting said marked governance term.

12. The computer system according to claim 8, wherein the program instructions to delete the governance term from the hierarchy further comprise: program instructions to replace an assignment relationship to the governance term by an assignment relationship to the parent node of the deleted governance term in the hierarchy.

13. The computer system according to claim 12, wherein the program instructions stored on the one or more computer readable storage media further comprise: program instructions to replace the deleted governance term in any governance rule of the plurality of governance rules by the parent node of said deleted governance term in said hierarchy.

14. The computer system according to claim 8, wherein a governance rule defines constraints to elements of the plurality of information assets in a category selected from a group comprising data quality criteria, data life cycle characteristics, data protection categories and, data security requirements.

15. A computer program product comprising:
one or more computer readable storage media and program instructions stored on the one or more computer readable storage media, the program instructions comprising:
program instructions to condense a hierarchy in a data governance system, wherein the hierarchy comprises a root node and at least one child node comprising related sub-trees by:
program instructions to determine, for a parent node in the hierarchy of the governance system, governance terms and respective assignment relationships from a plurality of information assets,
program instructions to determine usage of a governance term of the governance terms based on the respective assignment relationships that denote a logical connection between a node in the hierarchy and respective dedicated information assets meeting a threshold number of assignment relationships and usage of the governance term of the governance terms in at least one of a plurality of governance rules;
program instructions to prevent the governance term from being marked for deletion if the governance term is used in more than a predefined threshold rule number of a plurality of relationship rules;
program instructions to, in response to determining usage of the governance term fails to meet a threshold number of assignment relationships, mark the governance term of the governance terms for elimination based on the determined usage of the governance term, failure of the governance term to be used in the plurality of governance rules, and existence of a dedicated information asset associated with the governance term, the marking of the governance term comprising exempting the governance term for deletion for a predetermined grace period if the governance term and all related governance term children in the hierarchy are younger than a predefined minimum age; and
program instructions to delete the governance term from the hierarchy in the data governance system that is marked for elimination,
wherein the predetermined grace period is based on a context of the governance terms.

16. The computer-implemented method of claim 1, further comprising: ensuring consistency of the hierarchy of the governance system by replacing a to-be-deleted name of the governance term of the governance terms with another governance term.

* * * * *